US005878809A

United States Patent [19]
Heinle

[11] Patent Number: 5,878,809
[45] Date of Patent: Mar. 9, 1999

[54] PROCESS AND SYSTEM FOR CONTROLLING AN AIR-CONDITIONING SYSTEM FOR A VEHICLE INTERIOR

[75] Inventor: Dieter Heinle, Schulstrasse, Germany

[73] Assignee: Mercedes-Benz AG, Stuttgart, Germany

[21] Appl. No.: 678,512

[22] Filed: Jul. 9, 1996

[30]     Foreign Application Priority Data

Jul. 20, 1995 [DE] Germany .................. 195 26 450.9

[51] Int. Cl.⁶ .................................................... F25B 29/00
[52] U.S. Cl. .................. 165/203; 236/91 C; 265/42; 265/43
[58] Field of Search ............... 165/42, 43, 203; 236/91 C

[56]           References Cited

U.S. PATENT DOCUMENTS

| | | | |
|---|---|---|---|
| 4,382,463 | 5/1983 | Ikeburkuro | 165/237 |
| 4,881,456 | 11/1989 | Yasuda et al. | 165/203 |
| 4,887,890 | 12/1989 | Scherber et al. | 350/357 |
| 4,890,460 | 1/1990 | Takasi et al. | 165/43 |
| 4,920,759 | 5/1990 | Tanaka et al. | 165/203 |
| 4,961,462 | 10/1990 | Iida et al. | 165/204 |
| 5,020,424 | 6/1991 | Iido et al. | 165/43 |
| 5,054,686 | 10/1991 | Chuang | 236/91 C |
| 5,176,201 | 1/1993 | Yamamoto | 165/42 |
| 5,199,485 | 4/1993 | Ito et al. | 165/203 |
| 5,298,732 | 3/1994 | Chen | 250/203.4 |
| 5,337,802 | 8/1994 | Kajino et al. | 165/203 |
| 5,390,728 | 2/1995 | Ban | 165/237 |

FOREIGN PATENT DOCUMENTS

| | | | |
|---|---|---|---|
| 0417349 | 3/1991 | European Pat. Off. | 237/12.3 A |
| 3632892A1 | 4/1988 | Germany . | |
| 3714223C1 | 12/1988 | Germany . | |
| 38390307 | 5/1990 | Germany | 237/12.3 A |
| 404846A1 | 6/1992 | Germany . | |
| 4110702A1 | 10/1992 | Germany . | |
| 4110936A1 | 10/1992 | Germany . | |
| 4121383A1 | 1/1993 | Germany . | |
| 4327095A1 | 7/1994 | Germany . | |
| 4322159A1 | 1/1995 | Germany . | |
| 0049509 | 3/1983 | Japan | 165/43 |
| 59-186723 | 10/1984 | Japan . | |
| 61-204821 | 12/1986 | Japan . | |
| 0026111 | 2/1987 | Japan | 237/12.3 A |
| 1-172008 | 7/1989 | Japan | 219/202 |
| 2-41914 | 2/1990 | Japan . | |

*Primary Examiner*—John K. Ford
*Attorney, Agent, or Firm*—Evenson, McKeown, Edwards & Lenahan P.L.L.C.

[57]           ABSTRACT

A process for controlling an air-conditioning system for a passenger vehicle interior is disclosed in the case of which the air-conditioning output provided by individual air-conditioning ducts is controlled as a function of the vehicle seat occupancy. This permits a setting of the air-conditioning effect in the different areas of the vehicle interior which meets the requirements to a considerable extent. Individual solar intensity sensors at each of a plurality of individual seats control darkening of the side windows adjacent to the individual seats, whereby control of both the air-conditioning outlets and the window-darkening device associated with a respective seat as a function of the seat occupancy signal associated with the respective seat is carried out.

12 Claims, 2 Drawing Sheets

PROCESS AND SYSTEM FOR CONTROLLING AN AIR-CONDITIONING SYSTEM FOR A VEHICLE INTERIOR

BACKGROUND AND SUMMARY OF THE INVENTION

This invention relates to a process and system for controlling an air-conditioning system for a motor vehicle interior which has several, separately controllable air-conditioning ducts for different interior zones of the vehicle. Such processes are known particularly for controlling modern air-conditioning systems with two or more separately controllable air-conditioning ducts which are used for conditioning zones of the vehicle interior which differ with respect to the intensity. In this case, by way of automatic functions, frequently a largely automatic control or regulating of the interior air conditioning takes place, for which usually continuously controllable actuators, such as fans and/or ventilation flaps, are activated. By means of this conventional, automatic air conditioning, the vehicle is air-conditioned by way of all air-conditioning ducts uniformly in the whole interior, also where momentarily no vehicle occupants are situated.

In U.S. Pat. No. 5,176,201 and German Patent Document DE 40 40 846 A1, processes for controlling an air-conditioning system for an interior are described in which this control takes place, among other things, as a function of the sensor signal of a solar sensor.

On the other hand, devices for recognizing a seat occupancy are known. Thus, in German Patent Document DE 41 10 701 A1, a vehicle with an electric seat heater is disclosed in the case of which parts of the seat heater are designed as devices for recognizing a seat occupancy. A sensing system for recognizing a seat occupancy described in German Patent Document DE 41 10 936 A1 is used there for controlling a front passenger air bag as a function of whether the front passenger seat is occupied. Another seat occupancy sensing system is indicated in German Patent Document DE 43 22 159 A1 in which, as a usage purpose, in addition to the control of a front seat passenger air bag, the determination of a vehicle occupancy factor is mentioned by means of which it is to be determined with how many persons the vehicle has covered which mileage.

The invention is based on the technical problem of providing a process for controlling an air-conditioning system for the interior of a motor vehicle by means of which an air conditioning for a vehicle interior is achieved which meets the requirements comparatively well.

This problem is achieved by a system and process wherein the plurality of separate air-conditioning outlet ducts are controlled individually as a function of vehicle seat occupancy. By using a corresponding seat occupancy sensing system, it is provided in the case of this process to control the individual air-conditioning ducts, which are in each case assigned to different zones of the vehicle interior, as a function of the recognized seat occupancy. By means of this process, the air-conditioning effect can be increased with respect to the conventional air-conditioning method, which is unspecific with respect to the seat occupancy, in the areas in which vehicle occupants are momentarily situated, while it can be kept lower in zones of the interior in which no vehicle occupants are situated. As a result, an air conditioning can be carried out which is more targeted with respect to space and which, in comparison to the air conditioning which is unspecific concerning the seat occupancy, has the advantage that air-conditioning output may be saved in the interior zones which are occupied by vehicle occupants or, when an air-conditioning output exists, the desired air conditioning can be reached more rapidly.

In a further development of preferred embodiments of the invention, the process contains a targeted control of those air-conditioning ducts of a plurality of air-conditioning ducts of a heating and/or air-conditioning system during a heating or cooling operation in such a manner that the air-conditioning ducts assigned to the interior zones with the occupied vehicle seats are controlled for generating a higher air-conditioning output than the other air-conditioning ducts. This promotes the fast reaching of the desired air conditioning in those interior zones in which the occupants are seated in the vehicle.

In the case of a process according to further developed embodiments according to the invention, the control of the air-conditioning system for the interior takes place in a combined manner as a function of the seat occupancy as well as of the output signal of a solar sensor. By means of this process, an air-conditioning system for the interior equipped with a solar sensor can be controlled particularly according to the requirements also in operating conditions in which the solar sensor influences the air conditioning.

A further development of preferred embodiments the invention relates to an object which is suitable for controlling air-conditioning systems for the interior which comprise a controllable window darkening device. According to the process, a seat-occupancy-dependent controlling of this window darkening device is provided by means of which, for example, as required, only those panes are darkened whose assigned vehicle seat is occupied.

Other objects, advantages and novel features of the present invention will become apparent from the following detailed description of the invention when considered in conjunction with the accompanying drawings.

DETAILED DESCRIPTION OF THE INVENTION

Figure 1:
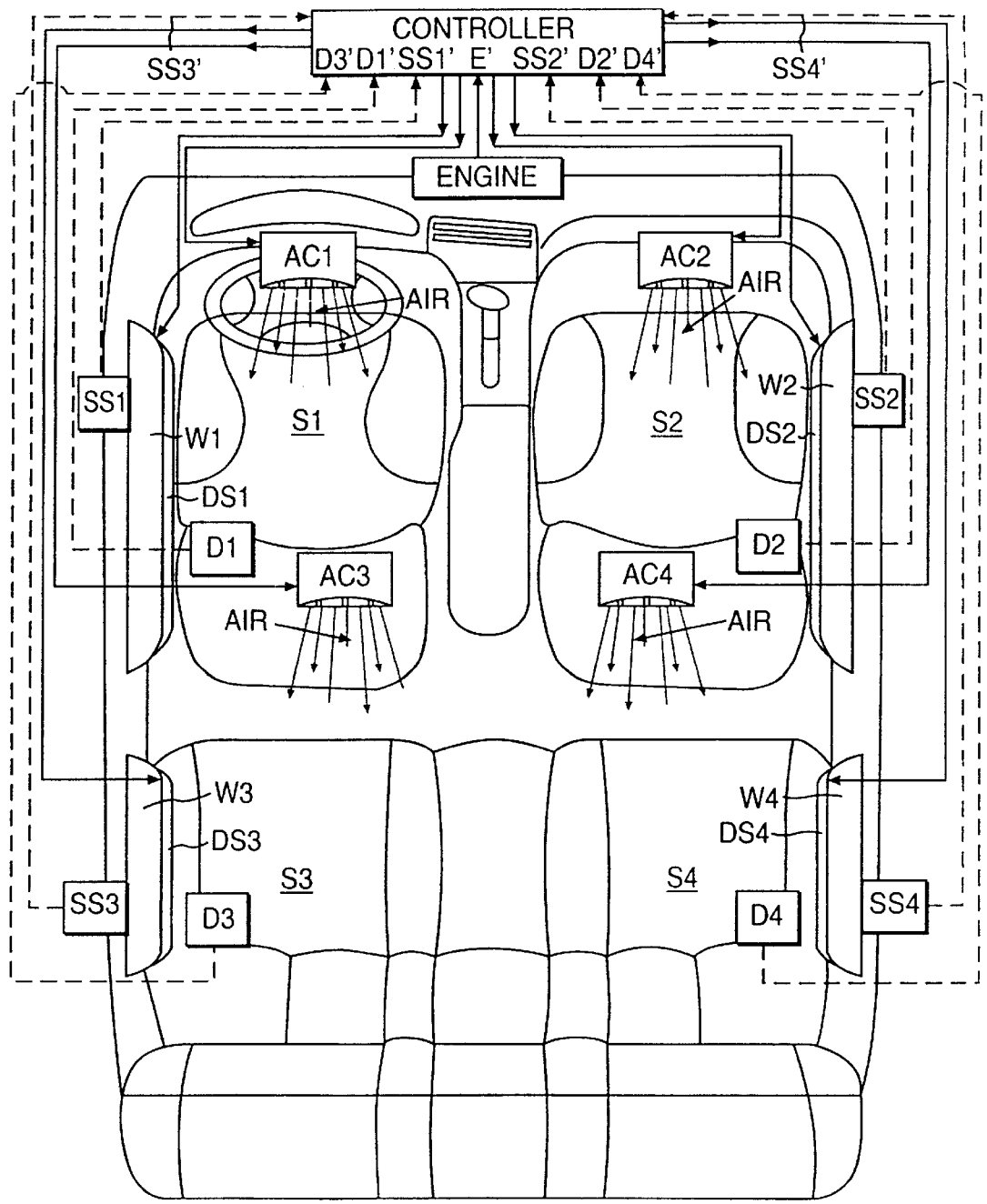
FIG. 1 is a schematic top view of a four-seat passenger car with an air-conditioning control system constructed according to a preferred embodiment of the invention.

FIG. 1 schematically depicts a four-seat passenger car, having a front left side driver's seat S1, a front right-side passenger seat S2, and rear passenger seats S3 and S4. Separately controllable air-conditioning outlets AC1, AC2, AC3 and AC4 are provided for supplying heated or cooled air-conditioning air to the respective passenger seat regions.

At each vehicle seat S1, S2, S3, S4 a respective occupancy detector D1, D2, D3, D4 is provided which sends a signal D1', D2', D3', D4' to a controller, which signal is indicative of whether or not the respective seat is occupied. The controller operates to control the respective air-conditioning outlets AC1, AC2, AC3, AC4 in dependence upon the presence or absence of a passenger in the respective associated passenger seat S1, S2, S3, S4. In this manner, as also described below, a very advantageous and economical utilization of the vehicle air-conditioning system is achieved while optimizing passenger comfort.

Adjacent each of the seats S1, S2, S3, S4 a respective side window W1, W2, W3, W4 is provided. These side windows W1, W2, W3, W4 are each provided with respective darkening devices DS1, DS2, DS3, DS4. Each window is also provided with a respective solar sensor SS1, SS2, SS3, SS4 which detects the sun radiation intensity at the respective window, providing an input signal SS1', SS2', SS3', SS4' to the controller which is indicative of the detected solar radiation intensity at the respective associated window W1, W2, W3, W4. These signals SS1', SS2', SS3', SS4' can be combined and arranged in the controller to provide a control input signal representative of the solar radiation intensity on the vehicle interior. Alternatively, a single solar sensor could be used. The controller is operative to control the respective darkening devices DS1, DS2, DS3, DS4 as a function of the presence or absence of a passenger in the associated seat. In certain preferred embodiments, the controller also is operative to control the window darkening devices DS1, DS2, DS3, DS4 as a function of the presence or absence of a passenger in the associated seat, and as a function of the respective associated signal indicating the solar radiation intensity at the respective window or at the vehicle interior.

A signal E' is generated and supplied to the controller to indicate the engine on and off condition. In certain preferred embodiments, the controller also controls continued operation in a "residual heat" function mode for occupied seats for a predetermined time after ignition shut-off.

Figure 2:
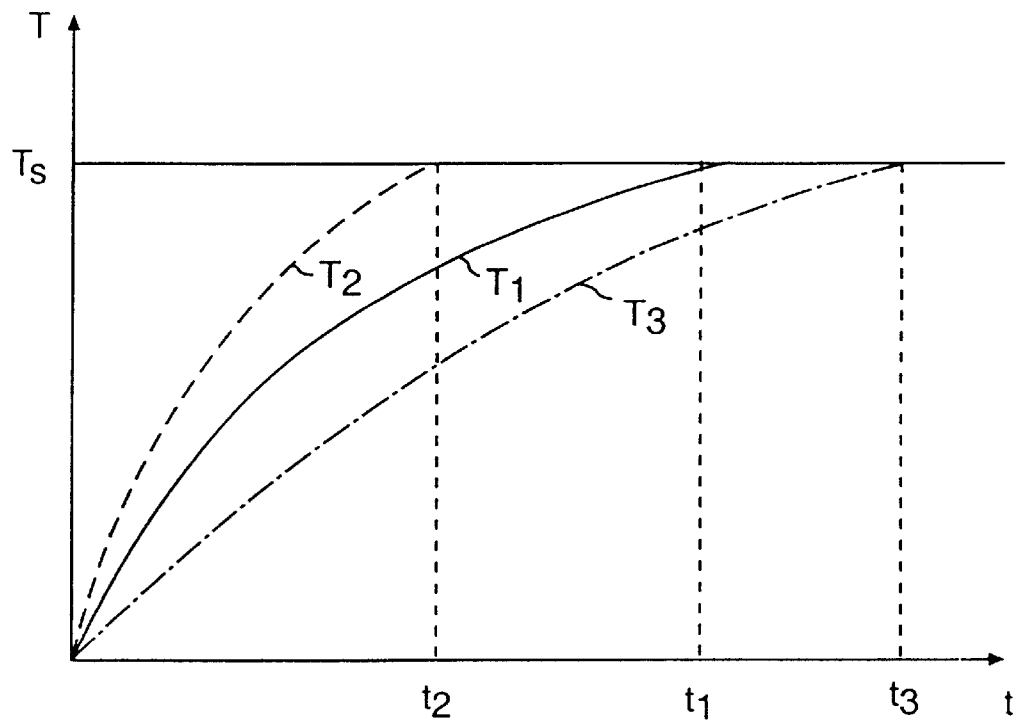
FIG. 2 is a temperature-time diagram for illustrating a heating operation of a process for controlling an air-conditioning system for the interior of a motor vehicle by means of a heating and air-conditioning system constructed according to FIG. 1.
Figure 3:
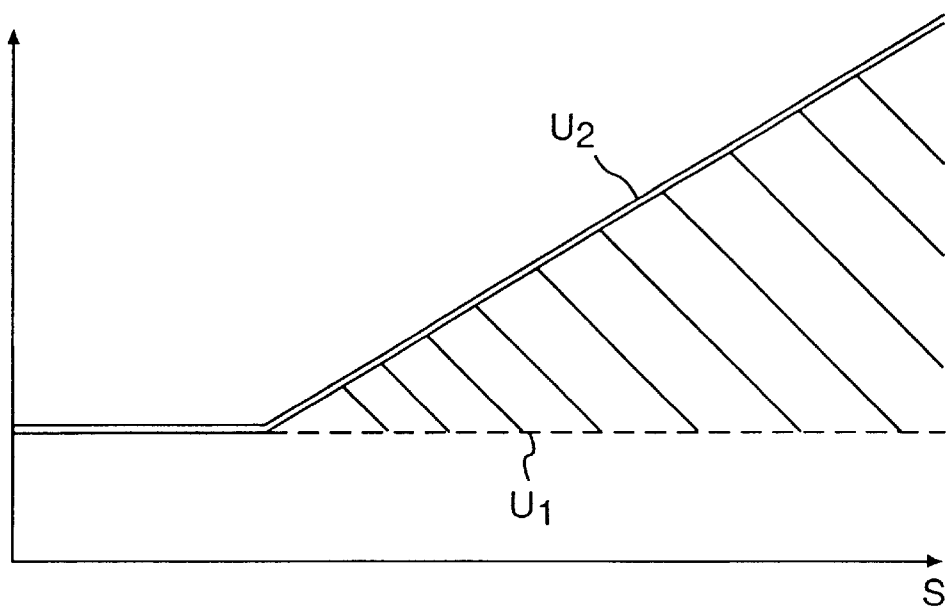
FIG. 3 is a diagram of the output of an air supply fan of a heating and air-conditioning system of a motor vehicle as a function of the sun radiation intensity detected by means of a solar sensor, for illustrating a control of this fan according to certain preferred embodiments of the invention.

FIGS. 2 and 3 and the following description explain further the specific operational modes of the preferred embodiments of air-conditioning systems schematically depicted in FIG. 1.

By means of FIG. 2, a process for heating a vehicle interior by means of the control of a heating and air-conditioning device according to the invention is explained in the following which comprises a driver-side and a front-passenger-side air-conditioning duct, and is compared with a conventional heating operation which is unspecific with respect to the seat occupancy.

As soon as, by way of a corresponding operating element, a heating of the interior is requested, in the case of the conventional heating operation, a supplying of heated air takes place uniformly by way of all existing air-conditioning ducts of the heating and air-conditioning system. This results in the same temperature increase in the interior on the driver side and on the front passenger side, as illustrated in FIG. 2 as an example by means of the solid characteristic curve ($T_1$) as a function of the time. By means of the uniform distribution of the heating output to the driver and the front passenger side, the desired set interior temperature ($T_S$) is reached on both sides simultaneously at a defined point in time (t1).

In contrast, in the case of the process according to the invention, first, by means of a conventional seat occupancy sensing system, which is assigned to each vehicle seat, it is determined on which vehicle seats vehicle occupants are situated, thus whether, for example, the front passenger seat S1 is occupied. The signal transmission from the seat occupancy sensing system to the control unit (Controller in FIG. 1) of the heating and air-conditioning system can take place depending on the existing vehicle electric system by way of normal wiring or by way of a data bus. When it is determined that all vehicle seats S1, S2, S3, S4 are occupied, the heating operation takes place in the above-mentioned conventional manner. When, in contrast, it is determined that, although the driver seat S1 is occupied, the front passenger seat S2 is not, the heating and air-conditioning system is controlled such that, by way of the driver-side air-conditioning duct AC1, a higher heat supply into the interior takes place than by way of the front-passenger-side air-conditioning duct AC2. In other words, the existing heating output is asymmetrically distributed between the driver and the front passenger side in that more heating output is apportioned to the driver side on which a vehicle occupant is situated than to the unoccupied front passenger side. A time sequence of the interior temperature increase on the driver side occurs therefore, for example, as represented in FIG. 2 by the interrupted characteristic curve ($T_2$). Because of the higher heating output, the temperature increase in the interior on the occupied driver side takes place faster than in the case of the conventional heating which is unspecific with respect to the seat occupancy so that the desired temperature ($T_S$) is already reached at an earlier point in time ($t_2$). In contrast, the heating on the front passenger side is limited to a minimal heating so that, in comparison to the heating operation which is unspecific with respect to the seat occupancy, a slower temperature increase occurs in the interior in this interior area, as represented in FIG. 2 by the dash-dotted characteristic curve ($T_3$). The desired temperature ($T_S$) is reached there at a later point in time ($t_3$) than in the case of the heating operation which is unspecific with respect to the seat occupancy, however, this does not matter, because no passenger is situated in this area of the interior.

The description of this heating operation demonstrates that, by means of the process and system according to the invention, the available heating output can be distributed in a manner which is specific to the seat occupancy in a targeted fashion such to the individual areas of the vehicle interior which are assigned to the respective air-conditioning ducts that the desired temperature in the areas of the interior in which a vehicle occupant is situated, is reached particularly rapidly, while, in the other areas, a basic air conditioning takes place which prevents undesirably high temperature gradients in the vehicle interior and avoids therefore, for example, the formation of so-called cold air rollers. Analogously, cooling operations also take place in the case of the process according to the invention in a targeted manner as a function of the seat occupancy in the vehicle interior while providing a higher cooling output for the air-conditioning ducts which, with respect to the intensity are assigned to interior areas in which the corresponding vehicle seat or seats are occupied.

By means of FIG. 3, in the following another aspect of the process and system according to the invention for controlling the heating and air-conditioning system is explained which relates to the air-conditioning control as a function of a solar sensor provided in the vehicle. In the diagram of FIG. 3, the sun radiation intensity (S) sensed by the solar sensor (a solar sensor signal) is entered on the abscissa and the voltage ($U_G$) applied to an air supply fan of the heating and air-conditioning unit is entered on the ordinate. The voltage ($U_G$) is a measurement of the fan output. Conventionally, as a function of the solar sensor signal (S), unspecifically with respect to the seat occupancy, a requirement-dependent lowering or raising of the temperature and/or the air amount takes place uniformly along all air-conditioning ducts, that is, ventilating ducts to which air can be supplied by the fan.

In order to carry out this control in a more optimized manner with respect to the requirements, according to the process of the invention the fan voltage ($U_G$) is raised only if, on the one hand, this is indicated on the basis of an increased sun radiation intensity (S) determined by the solar sensor and, on the other hand, a vehicle occupant is situated in the interior area which is assigned to the respective air-conditioning duct, which, in turn, is recognized by way of a corresponding signal of the seat occupancy sensor system D1, D2, D3, D4. FIG. 3 illustrates, as a solid curve ($U_2$), a typical conventional characteristic curve of the raising of the fan output voltage ($U_G$) as a function of the sun radiation intensity (S) which, starting from a specific radiation intensity in comparison to the normal fan output, represented by the interrupted horizontal curve ($U_1$), rises linearly. When now an increased radiation intensity (S) occurs but, for example, the front passenger seat S2 is not occupied, an increased amount of air which corresponds to the raised fan voltage ($U_2$) is supplied only to the driver side by way of the corresponding ventilating duct while, on the front passenger side, only the normal, not raised amount of air, which corresponds to the normal fan voltage ($U_1$), is supplied. As a result, as required, unnecessary noise elevations by the air supply fan can be avoided. By means of the hatching of the area between the two curves ($U_1$, $U_2$) in FIG. 2, it is indicated that, according to the requirements, any fan voltage value between the two curves ($U_1$, $U_2$) in the case of a given sun radiation intensity (S) and therefore an arbitrary reduced amount of fan output increase can be set for the interior areas whose pertaining vehicle seats are not occupied.

Furthermore, the following control measures of the motor vehicle air-conditioning system, which are not shown in detail in the drawing, are provided by means of the process according to the invention. On the one hand, the individual air-conditioning ducts AC1, AC2, AC3, AC4 with respect to their air-conditioning effect can be connected or disconnected individually in an automatic manner. For example, depending on the occupancy of the rear area, the rear area air conditioning can be activated or deactivated in a targeted manner. Furthermore, a special "residual heat" function provided in the case of the heating and air-conditioning system, after the switching-off of the ignition Signal E', can be automatically connected as a function of the seat occupancy if the vehicle occupant or occupants do not leave the vehicle but at least one vehicle seat remains occupied. When the air-conditioning system contains a window darkening device, for example, in the form of corresponding blinds, it may be provided according to the invention to darken individual panes as a function of the seat occupancy for an improved air conditioning; that is, to darken only those panes behind which vehicle occupants are situated.

The above description of an embodiment demonstrates that the process according to the invention for controlling an air-conditioning system for a vehicle interior permits an air conditioning of the individual interior area as a function of the occupancy by vehicle occupants which to a considerable extent corresponds to the requirements.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A passenger car air-conditioning system for a multi-seat passenger car of the type comprising:
    a passenger seat occupancy detection device at each of a plurality of passenger seats, said seat occupancy detection devices generating respective seat occupancy signals representative of an occupancy condition of a respective associated seat,
    a solar intensity sensor device at each of the plurality of passenger seats, said solar intensity sensor devices generating respective solar intensity signals representative of a solar intensity condition of a respective associated seat,
    a separately controllable air-conditioning outlet at each of the plurality of passenger seats,
    and a controller operable to control the air-conditioning outlets at the respective seats as a function of both the seat occupancy signal and the solar intensity signal associated with the respective seat;
    a window-darkening device at each of side windows adjacent each of the plurality of passenger seats;
    wherein said controller is operable to control both the air-conditioning outlet and the window-darkening device associated with a respective seat as a function of the seat occupancy signal associated with the respective seat.

2. A passenger air-conditioning system according to claim 1, wherein said controller is operable to increase air-conditioning at a respective air-conditioning outlet associated with respective occupied seats.

3. A passenger car air-conditioning system for a multi-seat passenger car according to claim 1, wherein said controller is operable to increase air-conditioning at a respective air-conditioning outlet associated with a respective seat when occupied and having a high solar intensity signal level.

4. A passenger car air-conditioning system for a multi-seat passenger car according to claim 1, further comprising:
    a residual air-conditioning function device for maintaining air-conditioning operation after vehicle ignition switch off,
    and wherein the controller is operable to operate the residual air-conditioning function device to maintain air-conditioning operation after vehicle ignition switch off when a seat occupancy signal indicates occupation of at least one seat.

5. A passenger car air-conditioning system for a multi-seat passenger car according to claim 2, further comprising:
    a residual air-conditioning function device for maintaining air-conditioning operation after vehicle ignition switch off,
    and wherein the controller is operable to operate the residual air-conditioning function device to maintain air-conditioning operation after vehicle ignition switch off when a seat occupancy signal indicates occupation of at least one seat.

6. A passenger car air-conditioning system for a multi-seat passenger car according to claim 3, further comprising:
    a residual air-conditioning function device for maintaining air-conditioning operation after vehicle ignition switch off,
    and wherein the controller is operable to operate the residual air-conditioning function device to maintain air-conditioning operation after vehicle ignition switch off when a seat occupancy signal indicates occupation of at least one seat.

7. A method of operating a passenger car air-conditioning system for a multi-seat passenger car of the type comprising:
    a passenger seat occupancy detection device at each of a plurality of passenger seats, said seat occupancy detection devices generating respective seat occupancy signals representative of an occupancy condition of a respective associated seat, a solar intensity sensor device at each of the plurality of passenger seats, said solar intensity sensor devices generating respective solar intensity signals representative of a solar intensity condition of a respective associated seat, and a separately controllable air-conditioning outlet at each of the plurality of passenger seats, said method comprising controlling the air-conditioning outlets at the respective seats as a function of both the seat occupancy signal and the solar intensity signal associated with the respective seat, wherein said air-conditioning system includes a window-darkening device at each of side windows adjacent each of the plurality of passenger seats, and wherein said controlling includes controlling both the air-conditioning outlet and the window-darkening device associated with a respective seat as a function of the seat occupancy signal associated with the respective seat.

8. A method according to claim 7, wherein said controlling includes increasing air-conditioning at a respective air-conditioning outlet associated with respective occupied seats.

9. A method according to claim 7, wherein said controlling includes increasing air-conditioning at a respective air-conditioning outlet associated with a respective seat when occupied and having a high solar intensity signal level.

10. A method according to claim 7, wherein said air-conditioning system includes a residual air-conditioning function device for maintaining air-conditioning operation after vehicle ignition switch off, and wherein the controlling includes operating the residual air-conditioning function device to maintain air-conditioning operation after vehicle ignition switch off when a seat occupancy signal indicates occupation of at least one seat.

11. A method according to claim 8, wherein said air-conditioning system includes a residual air-conditioning function device for maintaining air-conditioning operation after vehicle ignition switch off, and wherein the controlling includes operating the residual air-conditioning function device to maintain air-conditioning operation after vehicle ignition switch off when a seat occupancy signal indicates occupation of at least one seat.

12. A method according to claim 9, wherein said air-conditioning system includes a residual air-conditioning function device for maintaining air-conditioning operation after vehicle ignition switch off, and wherein the controlling includes operating the residual air-conditioning function device to maintain air-conditioning operation after vehicle ignition switch off when a seat occupancy signal indicates occupation of at least one seat.

* * * * *